United States Patent [19]

Miyata

[11] Patent Number: 5,326,549
[45] Date of Patent: Jul. 5, 1994

[54] COMPOSITE METAL HYDROXIDE AND PROCESS FOR THE PRODUCTION THEREOF

[75] Inventor: Shigeo Miyata, Takamatsu, Japan

[73] Assignee: Kabushiki Kaisha Kaisui Kagaku Kenkyujo, Kagawa, Japan

[21] Appl. No.: 971,459

[22] Filed: Nov. 4, 1992

[30] Foreign Application Priority Data

Nov. 7, 1991 [JP] Japan .................................. 3-319827

[51] Int. Cl.$^5$ .................. C01G 49/00; C01G 51/00; C01G 53/00
[52] U.S. Cl. .................................. 423/594; 423/593
[58] Field of Search ........................ 423/583, 594

[56] References Cited

U.S. PATENT DOCUMENTS

| | | | |
|---|---|---|---|
| 3,879,523 | 4/1975 | Miyata | 423/593 |
| 3,879,525 | 4/1975 | Miyata | 423/593 |
| 4,812,426 | 3/1989 | Takagi et al. | 423/594 |

FOREIGN PATENT DOCUMENTS 0207811  1/1987  European Pat. Off.

OTHER PUBLICATIONS

Mitsui Toatsu Chem., DATABASE WPIL Week 8731 AN 87-219147 Abstracting JP-A-62 146 929, Jun. 30, 1987.

Toshiba KK, DATABASE WPIL Week 8516 AN 85-096108 Abstracting JP-A-60 044 003, Mar. 8, 1985.

Daido Tokushuko KK, DATABASE WPIL Week 8319 AN 83-45176k Abstracting JP-A-58 055 042, Sep. 26, 1981.

Mura Kashi Sekkai K, DATABASE WPIL Week 8951 AN 89-374991 Abstracting JP-A-1 282 119, Nov. 14, 1989.

*Primary Examiner*—Mark L. Bell
*Assistant Examiner*—Willie J. Thompson
*Attorney, Agent, or Firm*—Wenderoth, Lind & Ponack

[57] ABSTRACT

A composite metal hydroxide which overcomes the instability and coarse crystal formation of calcium hydroxide and can be used in fields where calcium hydroxide conventionally cannot be used, e.g., as an agent for neutralizing or inactivating acids or halogens in plastics and rubbers and as a flame retardant for plastics and rubbers. The composite metal hydroxide has the formula, $$Ca_{1-x}M^{2+}{}_x(OH)_2$$

wherein $M^{2+}$ is at least one divalent metal ion selected from the group consisting of $Mg^{2+}$, $Mn^{2+}$, $Fe^{2+}$, $Co^{2+}$, $Ni^{2+}$, $Cu^{2+}$ and $Zn^{2+}$, and x is defined by $0.005 < x < 0.4$.

4 Claims, No Drawings

COMPOSITE METAL HYDROXIDE AND PROCESS FOR THE PRODUCTION THEREOF

FIELD OF THE INVENTION

The present invention relates to a novel calcium hydroxide solid solution and a process for the production thereof. More specifically, it relates to a novel calcium hydroxide solid solution which is excellent in shelf life, dispersibility and the activity to neutralize or receive acids and halogens and which is useful as an acid acceptor for halogen-containing rubbers, a heat stabilizer for a vinyl chloride resin, an agent for neutralizing or receiving residual acid substances and catalysts in plastics and a thickener for FRP and a flame retardant, and a process for the production thereof.

PRIOR ART

Having characteristic features of a low cost, high alkalinity, non-toxicity and high whiteness, calcium hydroxide is used as an agent for improving acidic soil, a flue gas desulfurization agent and a neutralizer for acids. Calcium hydroxide is also used as a raw material for bleaching powders, a raw material for cement mortar and an agent for receiving ammonia from ammonium chloride.

Calcium hydroxide has characteristic features in that it exhibits high alkalinity next to sodium hydroxide and potassium hydroxide and that it is less expensive. The defect with calcium hydroxide is that it reacts with carbonic acid gas while being in contact with the atmosphere to be gradually converted to calcium carbonate. Calcium hydroxide thus has a problem concerning stability. Calcium carbonate forms a coarse crystal since it has high solubility in water. Therefore, when used for neutralizing or receiving acidic substances in resins or rubbers, calcium hydroxide causes a problem concerning dispersibility, activity, the appearance of a molded article, water resistance and acid resistance. Further, even when an attempt is made to use calcium hydroxide as a non-toxic, halogen-free flame retardant, it is useless since its flame retardancy is extraordinarily lower than that of magnesium hydroxide.

SUMMARY OF THE INVENTION

It is an object of the present invention to provide a novel calcium hydroxide solid solution and a process for the production thereof.

It is another object of the present invention to provide a novel calcium hydroxide solid solution excellent in shelf life, dispersibility, neutralization of acids and acceptance of halogens, and a process for the production thereof.

It is further another object of the present invention to provide a novel calcium hydroxide solid solution usable in fields where calcium hydroxide conventionally cannot be used, for example, as an agent for neutralizing or inactivating acids or halogens in plastics and rubbers and as a flame retardant for plastics and rubbers, and a process for the production thereof.

According to the present invention, there is provided a composite metal hydroxide of the formula (1),

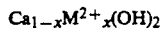

$$Ca_{1-x}M^{2+}{}_x(OH)_2$$

wherein $M^{2+}$ is at least one divalent metal ion selected from the group consisting of $Mg^{2+}$, $Mn^{2+}$, $Fe^{2+}$, $Co^{2+}$, $Ni^{2+}$, $Cu^{2+}$ and $Zn^{2+}$, and x is defined by $0.005 < x < 0.4$, preferably by $0.01 \leq x \leq 0.3$.

According to the present invention, there is also provided a process for the production of the above composite metal hydroxide, which comprises preparing a mixed aqueous solution containing water-soluble calcium ion and water-soluble divalent metal ion, $M^{2+}$, selected from the group consisting of $Mg^{2+}$, $Mn^{2+}$, $Fe^{2+}$, $Co^{2+}$, $Ni^{2+}$, $Cu^{2+}$ and $Zn^{2+}$ and having a $M^{2+}/(Ca^{2+}+M^{2+})$ molar ratio defined by $0.005 < M^{2+}/(Ca^{2+}+M^{2+}) < 0.4$, adding an alkaline substance in an amount equivalent to a total equivalent weight of the water-soluble calcium ion and the water-soluble divalent metal ion, and allowing the resultant mixture to react.

According to the present invention, there is also provided a process for the production of the above composite metal hydroxide, which comprises reacting calcium hydroxide or calcium oxide and water-soluble divalent metal ion, $M^{2+}$, selected from the group consisting of $Mg^{2+}$, $Mn^{2+}$, $Fe^{2+}$, $Co^{2+}$, $Ni^{2+}$, $Cu^{2+}$ in an aqueous medium under conditions of $0.005 < M^{2+}/(Ca^{2+}+M^{2+}) < 0.4$ in molar ratio.

DETAILED DESCRIPTION OF THE INVENTION

The present inventor has made a diligent study to overcome the above-described problems of calcium hydroxide, and as a result, has found that any one of the divalent metal ions described as $M^{2+}$ in the formula (1) can form a solid solution with calcium hydroxide. It has been found that the formed solid solution exhibits improved stability since it shows improved acid resistance over calcium hydroxide and inhibited reactivity with carbonic acid gas. Further, it has been also found that the above solid solution is generally of much finer particles than calcium hydroxide. As a result, the above solid solution shows improved dispersibility in plastics and rubbers, which has been desired for a long time, and it can be expected that the solid solution exhibits improved reactivity with acids and halogens in plastics and rubbers. Moreover, it has been found that the solid solution of the present invention has a lower dehydration temperature than calcium hydroxide, and that the dehydration temperature of this solid solution comes close to the dehydration temperature of magnesium hydroxide which is suitable as a flame retardant (about 430° C., a value determined by differential thermal analysis). This finding reveals that calcium hydroxide, which has not been suitable as a flame retardant due to its high dehydration temperature as compared with the ignition temperatures of plastics and rubbers, can be expected to be usable as a flame retardant when converted to a solid solution according to the present invention.

When subjected to powder X-ray diffractometry, the solid solution of the present invention shows only a diffraction pattern corresponding to the diffraction pattern of calcium hydroxide, and does not show any diffraction pattern of hydroxide of any one of the divalent metals described in the formula (1). To be more precise, the diffraction pattern of the solid solution of the present invention is influenced by the ionic radius of the divalent metal used and the content of the divalent metal in the solid solution. That is, with a decrease in the ionic radius and with an increase in the divalent metal content, the solid solution shows a smaller lattice constant than that of calcium hydroxide although it is a slight degree. Therefore, the diffraction pattern of the solid solution of the present invention slightly shifts to a higher angle side (Bragg angle) from that of calcium hydroxide.

The dehydration temperature of the solid solution of the present invention, when measured by differential thermal analysis (DTA), is lower than the dehydration temperature of calcium hydroxide. The lower the dehydration temperature of hydroxide of the divalent metal specified in the formula (1) is, the larger the degree of a decrease in the dehydration temperature of the solid solution is. Further, the larger the divalent metal content in the solid is, the larger the degree of a decrease in the dehydration temperature of the solid solution is.

The solid solution of the present invention can be produced by a variety of methods. For example, it can be produced by a method in which an aqueous solution containing calcium ion and an aqueous solution containing divalent metal ion are mixed in a mixing ratio which satisfies x in the formula (1), then an alkaline substance is added to attain pH of about 11 or more and the resultant mixture is allowed to react with stirring, or by a method in which an aqueous solution containing calcium ion, an aqueous solution containing divalent metal ion and an alkaline substance are independently charged to a reactor in such amounts that the calcium ion and the divalent metal ion satisfy x in the formula (1) and that the resultant mixture has pH of about 11 or more. There is also another method in which calcium hydroxide or calcium oxide is used as a calcium ion source, and this calcium ion source is allowed to react with an aqueous solution containing divalent metal ion at pH of about 11 or more. Although not specially limited, the temperature for the reaction in each method above is preferably between about 0° C. and 100° C.

The above aqueous solution containing calcium ion is prepared by dissolving a compound to give calcium ion in water. The compound to give calcium ion includes calcium chloride, calcium nitrate, calcium bromide, calcium iodide, calcium acetate, calcium hydroxide, calcium oxide, and calcium alkoxides such as calcium methoxide, calcium ethoxide, calcium propoxide and calcium isopropoxide. The above aqueous solution containing divalent metal ion is prepared by a compound to give divalent metal ion in water. The compound to give divalent metal ion includes chlorides, bromides, iodides, nitrates and acetates of Mg, Mn, Fe, Co, Ni, Cu and Zn, and alkoxides of these metals such as methoxides, ethoxides, propoxides and isopropoxides. The alkaline substance includes sodium hydroxide, potassium hydroxide, calcium hydroxide and calcium oxide.

As described above, the present invention provides a novel calcium hydroxide solid solution and a process for the production thereof. Further, the present invention provides a novel calcium hydroxide solid solution which is excellent in a shelf life, dispersibility and suitability as a flame retardant while maintaining the properties of calcium hydroxide.

The present invention will be further described in detail by reference to Examples.

EXAMPLE 1

One liter of an aqueous solution of a mixture of calcium chloride of reagent first grade with cupric chloride of reagent first grade ($Ca^{2+}=1.7$ mol/l, $Cu^{2+}=0.3$ mol/l) and one liter of sodium hydroxide of reagent first grade (4 mol/l) were respectively and continuously charged, at a flow rate of 40 milliliters/minute, into a 5-liter cylindrical reactor which had preliminarily contained 1 liter of deionized water with measuring pumps, and stirred to allow them to react until the charging of the total amount of each was finished. The reaction mixture had pH of 12.0 to 12.2 and a temperature of 21.0° C. After the reaction, the resultant precipitate was filtered under reduced pressure, washed with water and dried.

The resultant product was sieved with a 100-mesh sieve, and measured for a chemical composition, a powder X-ray diffraction pattern, an average secondary particle size, a differential thermal analysis value (dehydration peak temperature) and a shelf life. Table 1 shows the results. The above property values in this Example and Examples to follow were measured as follows.

Chemical composition: Measured by a chelate titration method.

Average secondary particle size: Treated by ultrasonic waves for 3 minutes and then measured with a microtrack particle size analyzer.

Shelf life: A sample was exposed to the atmosphere at room temperature, and the number of days was counted until calcium carbonate was detected by powder X-ray diffractometry.

EXAMPLE 2

200 Milliliter of deionized water was placed in a 1-liter beaker and stirred with a stirrer. 250 Milliliters (2 mol/l) of calcium hydroxide and 50 ml (1 mol/l) of zinc nitrate were added to the beaker together over about 1 minute, and the resultant mixture was allowed to react for 15 minutes with continuously stirring. The reaction mixture had pH of 12.0 and a temperature of 30° C. The reaction mixture was filtered under reduced pressure, and the remaining solid was washed with water and dried. The resultant product was sieved with a 100-mesh sieve, and evaluated in the same manner as in Example 1. Table 1 shows the results.

EXAMPLE 3

One liter of an aqueous solution of a mixture of calcium nitrate of reagent first grade with magnesium chloride of reagent first grade ($Ca^{2+}=2.85$ mol/l, $Mg^{2+}=0.15$ mol/l) and 1 liter of sodium hydroxide of reagent first grade (6 mol/l) were respectively warmed up to 40° C., and charged into a 5-liter cylindrical reactor at a rate of 40 milliliters/minute each with measuring pumps. The cylindrical reactor had contained 500 ml of deionized water, which had been warmed up to, and maintained at, 40° C. and stirred. The resultant mixture was allowed to react for 20 minutes with stirring. The reaction mixture had pH of 11.8. The reaction mixture was filtered under reduced pressure, and the remaining solid was washed with water and dried. The resultant product was sieved with a 100-mesh sieve, and evaluated in the same manner as in Example 1. Table 1 shows the results.

EXAMPLE 4

200 Milliliters of deionized water was placed in a 1-liter beaker, and while the deionized water was stirred with a stirrer, 230 ml (2 mol/l) of calcium hydroxide and 40 ml (1 mol/l) of nickel chloride were added to the beaker together over about 1 minute. The resultant mixture was allowed to react for about 10 minutes with continuously stirring. The reaction mixture had pH of 11.9 and a temperature of 42° C. The reaction mixture was filtered under reduced pressure, and the remaining solid was washed with water and dried. The resultant product was sieved with a 100-mesh sieve, and evaluated in the same manner as in Example 1. Table 1 shows the results.

EXAMPLE 5

Calcium chloride and manganese chloride were dissolved in deoxidation-treated water to prepare 300 ml of a mixed aqueous solution containing 1.6 mol/l of calcium chloride and 0.4 mol/l of manganese chloride. Calcium hydroxide was dissolved in deoxidation-treated water to prepare 300 ml of an aqueous solution containing 4 mol/l of calcium hydroxide. 150 Milliliters of deionized water was placed in a 1-liter four-necked flask, and while the deionized water was stirred, the above two solutions were added over about 3 minutes under nitrogen atmosphere to allow the resultant mixture to react. The resultant reaction mixture had pH of 12.2 and a temperature of 32° C. The reaction mixture was filtered and the remaining solid was washed with water and dried under nitrogen atmosphere. The resultant product was sieved with a 100-mesh sieve, and evaluated in the same manner as in Example 1. Table 1 shows the results.

EXAMPLE 6

Example 5 was repeated except that the mixed aqueous solution containing calcium chloride and manganese chloride was replaced with 300 ml of a mixed aqueous solution containing 1.8 mol/l of calcium chloride and 0.2 mol/l of cobaltous chloride. The resultant reaction mixture had pH of 11.9 and a temperature of 23° C. The reaction mixture was treated in the same manner as in Example 5, and evaluated in the same manner as in Example 1. Table 1 shows the results.

EXAMPLE 7

Example 5 was repeated except that the mixed aqueous solution containing calcium chloride and manganese chloride was replaced with 300 ml of a mixed aqueous solution containing 1.8 mol/l of calcium chloride and 0.2 mol/l of ferrous chloride. The resultant reaction mixture had pH of 12.0 and a temperature of 25° C. The reaction mixture was treated in the same manner as in Example 5, and evaluated in the same manner as in Example 1. Table 1 shows the results.

COMPARATIVE EXAMPLE 1

Calcium hydroxide prepared by slaking a calcined product of natural lime was filtered and dried. The resultant product was sieved with a 100-mesh sieve, and evaluated in the same manner as in Example 1. Table 1 shows the results.

COMPARATIVE EXAMPLE 2

Example 1 was repeated except that the mixed aqueous solution containing calcium chloride and cupric chloride was replaced with an aqueous solution of a mixture of calcium chloride of reagent first grade with cupric chloride of reagent first grade ($Ca^{2+} = 1.2$ mol/l, $Cu^{2+} = 0.8$ mol/l). The reaction mixture was treated in the same manner as in Example 1, and evaluated in the same manner as in Example 1. Table 1 shows the results.

COMPARATIVE EXAMPLE 3

Example 2 was repeated except that the amount of zinc nitrate was changed from 50 ml to 150 ml (1 mol/l). The reaction mixture was treated in the same manner as in Example 2, and evaluated in the same manner as in Example 1. Table 1 shows the results.

TABLE 1

| Example | $M^{2+}/(Ca^{2+} + M^{2+})$ | Powder X-ray diffraction | Particle diameter (μm) | Dehydration temperature (°C.) | Shelf life (day) |
|---|---|---|---|---|---|
| Ex. 1 | 0.15 | A | 1.26 | 436 | 8 |
| Ex. 2 | 0.10 | A | 1.41 | 438 | 5 |
| Ex. 3 | 0.05 | A | 0.72 | 440 | 3 |
| Ex. 4 | 0.08 | A | 0.78 | 435 | 5 |
| Ex. 5 | 0.22 | A | 0.85 | 422 | 12 |
| Ex. 6 | 0.10 | A | 1.10 | 448 | 6 |
| Ex. 7 | 0.10 | A | 0.98 | 452 | 6 |
| CEx. 1 | 0 | B | 5.79 | 536 | 1 |
| CEx. 2 | 0.42 | C | 2.48 | 323 | 10 |
|  |  |  |  | 434 |  |
|  |  |  |  | 548 |  |
| CEx. 3 | 0.31 | D | 2.91 | 165 | 6 |
|  |  |  |  | 460 |  |

Notes:
A: Showing the pattern of $Ca(OH)_2$ with a slight shift toward a high angle side.
B: Showing the pattern of $Ca(OH)_2$.
C: Showing patterns of $Ca(OH)_2$ and $Cu_2(OH)_3Cl$.
D: Showing patterns of $Ca(OH)_2$ and $Ca[Zn(OH)_3]_2 \cdot 2H_2O$.
Particle diameter = average secondary particle diameter

What is claimed is:

1. A composite metal hydroxide of the formula, $$Ca_{1-x}M^{2+}_x(OH)_2$$

wherein $M^{2+}$ is at least one divalent metal ion selected from the group consisting of $Mg^{2+}$, $Mn^{2+}$, $Fe^{2+}$, $Co^{2+}$, $Ni^{2+}$, $Cu^{2+}$ and $Zn^2$, and x is defined by $0.005 < x < 0.4$.

2. A composite metal hydroxide according to claim 1, wherein x in the formula is defined by $0.01 \leq x \leq 0.3$.

3. A process for the production of the composite metal hydroxide recited in claim 1, which comprises preparing a mixed aqueous solution containing water-soluble calcium ion and water-soluble divalent metal ion, $M^{2+}$, selected from the group consisting of $Mg^{2+}$, $Mn^{2+}$, $Fe^{2+}$, $Co^{2+}$, $Ni^{2+}$, $Cu^{2+}$ and $Zn^{2+}$ and having a $M^{2+}/(Ca^{2+} + M^{2+})$ molar ratio defined by $0.005 < M^{2+}/(Ca^{2+} + M^{2+}) < 0.4$, adding an alkaline substance in an amount equivalent to a total equivalent weight of the water-soluble calcium ion and the water-soluble divalent metal ion, and allowing the resultant mixture to react.

4. A process for the production of the above composite metal hydroxide recited in claim 1, which comprises reacting calcium hydroxide or calcium oxide and water-soluble divalent metal ion, $M^{2+}$, selected from the group consisting of $Mg^{2+}$, $Mn^{2+}$, $Fe^{2+}$, $Co^{2+}$, $Ni^{2+}$, $Cu^{2+}$ and $Zn^{2+}$ in an aqueous medium under conditions of $0.005 < M^{2+}/(Ca^{2+} + M^{2+}) < 0.4$ in molar ratio.

* * * * *